United States Patent
Ikeda

(10) Patent No.: US 10,740,171 B2
(45) Date of Patent: Aug. 11, 2020

(54) INFORMATION PROCESSING APPARATUS, MEMORY CONTROL METHOD FOR INFORMATION PROCESSING APPARATUS, AND PROGRAM

(71) Applicant: CANON KABUSHIKI KAISHA, Tokyo (JP)

(72) Inventor: Atsushi Ikeda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 14/976,446

(22) Filed: Dec. 21, 2015

(65) Prior Publication Data

US 2016/0188215 A1 Jun. 30, 2016

(30) Foreign Application Priority Data

Dec. 26, 2014 (JP) ................................. 2014-264250

(51) Int. Cl.
*G06F 11/10* (2006.01)
(52) U.S. Cl.
CPC .............................. *G06F 11/1004* (2013.01)
(58) Field of Classification Search
CPC .. G06F 3/1204; G06F 3/1231; G06F 11/1004; G06F 12/0246; H04N 1/00347; H04N 1/0035; H04N 1/00413; H04N 2201/3216; H04N 2201/3219; H04N 2201/3221; H04N 2201/3222; H04N 2201/3232
USPC ........................................................ 711/103
See application file for complete search history.

(56) References Cited

U.S. PATENT DOCUMENTS

| | | | | |
|---|---|---|---|---|
| 5,309,251 A | * | 5/1994 | Terajima | G06Q 20/363 358/400 |
| 7,984,324 B2 | * | 7/2011 | Daud | G06F 11/0709 714/42 |
| 8,825,938 B1 | * | 9/2014 | Ellard | G06F 12/0246 711/103 |
| 2001/0014910 A1 | * | 8/2001 | Bobo, II | H04L 29/06 709/206 |
| 2005/0060484 A1 | * | 3/2005 | Ogino | G11C 29/16 711/103 |
| 2006/0053246 A1 | * | 3/2006 | Lee | G06F 9/4403 711/100 |

(Continued)

FOREIGN PATENT DOCUMENTS

| | | |
|---|---|---|
| JP | H10-040122 A | 2/1998 |
| JP | 2006-325028 A | 11/2006 |

(Continued)

*Primary Examiner* — Yaima Rigol
(74) *Attorney, Agent, or Firm* — Canon U.S.A., Inc. IP Division

(57) ABSTRACT

In an information processing apparatus including a first memory storing data, whether the first memory is in a state where the stored data is readable and data is unwritable is determined. When it is determined that the first memory is in the state, whether particular data is stored in the first memory is determined. When it is determined that the particular data is stored in the first memory, whether a second memory is connected to the information processing apparatus is determined. When it is determined that the second memory is connected, the particular data is read from the first memory and is written into the second memory.

17 Claims, 6 Drawing Sheets

(56) References Cited

U.S. PATENT DOCUMENTS

| | | | | |
|---|---|---|---|---|
| 2006/0262356 A1* | 11/2006 | Honda | | H04N 1/00347 358/400 |
| 2007/0019020 A1* | 1/2007 | Wakai | | H04N 1/00127 347/15 |
| 2007/0081182 A1* | 4/2007 | Shiohara | | H04N 1/64 358/1.13 |
| 2010/0125751 A1* | 5/2010 | McKean | | G06F 11/1662 714/5.1 |
| 2011/0145633 A1* | 6/2011 | Dickens | | G06F 11/073 714/6.1 |
| 2012/0284453 A1* | 11/2012 | Hashimoto | | G06F 3/0616 711/103 |
| 2012/0284498 A1* | 11/2012 | Chou | | G06F 9/4401 713/2 |
| 2013/0132629 A1* | 5/2013 | Lin | | G06F 13/385 710/305 |
| 2013/0179667 A1* | 7/2013 | Wang | | G06F 21/74 712/228 |
| 2013/0318392 A1* | 11/2013 | Guo | | G06F 11/2094 714/6.11 |
| 2015/0074467 A1* | 3/2015 | Jacoby | | G06F 11/008 714/47.1 |
| 2015/0143170 A1* | 5/2015 | Andrews | | G06F 11/1435 714/15 |
| 2015/0169483 A1* | 6/2015 | Kameoka | | G05B 15/02 710/2 |
| 2016/0147620 A1* | 5/2016 | Lesartre | | G06F 11/1666 714/6.3 |
| 2016/0154700 A1* | 6/2016 | Tian | | G06F 12/0653 714/15 |

FOREIGN PATENT DOCUMENTS

| | | |
|---|---|---|
| JP | 2010-016530 A | 1/2010 |
| JP | 2010-199665 A | 9/2010 |
| JP | 2012-240397 A | 12/2012 |
| JP | 2013-047913 A | 3/2013 |
| JP | 2013-158956 A | 8/2013 |

* cited by examiner

INFORMATION PROCESSING APPARATUS, MEMORY CONTROL METHOD FOR INFORMATION PROCESSING APPARATUS, AND PROGRAM

BACKGROUND OF THE INVENTION

Field of the Invention

The present invention relates to an information processing apparatus, a memory control method for the information processing apparatus, and a program.

Description of the Related Art

In an information processing apparatus, for example, a multifunction peripheral (MFP) having multiple functions, such as copying, printing, scanning, and faxing, a service error may occur due to, for example, a failure in a printing unit. In such an error state, it is difficult to continuously use the MFP. A user has to make an inquiry about the error of a distributer or a service department.

An MFP may temporarily enter a service error state because of a mechanical problem. For example, some of manuals describe that a user can turn the MFP off and then on again and see whether the MFP works. In some cases, the MFP may fail to recover from the service error state. Some of MFPs targeted at a relatively large office have a configuration, called degeneracy, in which only functions that do not require a portion suffering a failure are continuously available.

Most of compact MFPs (CMFPs) targeted at, for example, a small office home office (SOHO) are configured such that if a service error occurs, a service error message is displayed and the continuous use of the whole CMFP is not allowed, because processes of the CMFP are simplified.

In such a CMFP, if received facsimile image data cannot be output due to, for example, a failure in a printing unit, the received facsimile image data may be virtually lost. Unfortunately, a user may suffer a significant loss. To avoid such a loss, a known CMFP is configured such that if a service error occurs, received facsimile image data can be transferred to any destination.

For reasons different from the above, some of CMFPs use an embedded multi-media card (eMMC) as a storage for storing and saving a main program, various setting values, facsimile image data, and destinations of the facsimile image data.

The eMMC has characteristics: at the end of its service life, the eMMC enters a read-only state where data can be read from the eMMC but data cannot be written into the eMMC.

If a failure (including the end of the service life) of a storage is detected during execution of a main program in such a CMFP, the CMFP typically enters a service error state. Furthermore, if a failure of a storage storing the main program is detected during execution of a boot program just after turn-on, the main program cannot be loaded. The CMFP is accordingly forced to undergo a transition to the service error state during execution of the boot program.

It is assumed that a failure of a storage is caused by the read-only state of the eMMC. At this time, facsimile image data can be read but a transfer destination cannot be written. Disadvantageously, a transfer function cannot be used for the received facsimile image data upon occurrence of a service error, as described above. As a measure against to such a case, a technique described in Japanese Patent Laid-Open No. 2010-199665 can be used to configure a CMFP so that received facsimile image data can be saved to a universal serial bus (USB) memory.

SUMMARY OF THE INVENTION

The configuration, based on the technique described in Japanese Patent Laid-Open No. 2010-199665, in which received facsimile image data can be saved to a USB memory, however, has the following disadvantages associated with the main program.

As described above, some of manuals describe that a user can turn an apparatus off and then on again upon occurrence of a service error and see whether the apparatus works. In many cases, a user turns an apparatus off and then on again without reading a manual upon occurrence of a failure.

It is assumed that a failure of a storage is caused by the read-only state of an eMMC. At this time, a main program can be loaded but various write processes, which are to be executed upon start of the main program, for saving start history information and printing unit information to the storage cannot be executed normally. It is very difficult to guarantee a normal operation of the main program while skipping all of the write processes.

In this case, the apparatus is accordingly forced to undergo a transition to the service error state during execution of a boot program. In other words, since the main program is not started, the above-described function for saving received facsimile image data cannot be used if the apparatus has this function.

The present invention has been made to solve the above-described problems. The present invention provides a mechanism that prevents loss of particular data in such a manner that if an apparatus undergoes a transition to a state where data can be read from a memory storing the particular data but data cannot be written into the memory, the particular data is written into another memory.

The present invention provides an information processing apparatus including a first memory storing data. The information processing apparatus includes a first determination unit configured to determine whether the first memory is in a state where the stored data is readable and data is unwritable, a second determination unit configured to determine whether particular data is stored in the first memory when it is determined that the first memory is in the state, a third determination unit configured to determine whether a second memory is connected to the information processing apparatus when it is determined that the particular data is stored in the first memory, and a writing unit configured to read the particular data from the first memory and write the read data into the second memory when it is determined that the second memory is connected.

According to the present invention, if a memory storing particular data undergoes a transition to a state where data is readable and data is unwritable, the particular data is written into another memory. This prevents the particular data from being lost.

Further features of the present invention will become apparent from the following description of exemplary embodiments with reference to the attached drawings.

DESCRIPTION OF THE EMBODIMENTS

Embodiments of the present invention will be described with reference to the drawings.
System Configuration

First Embodiment

Figure 1:
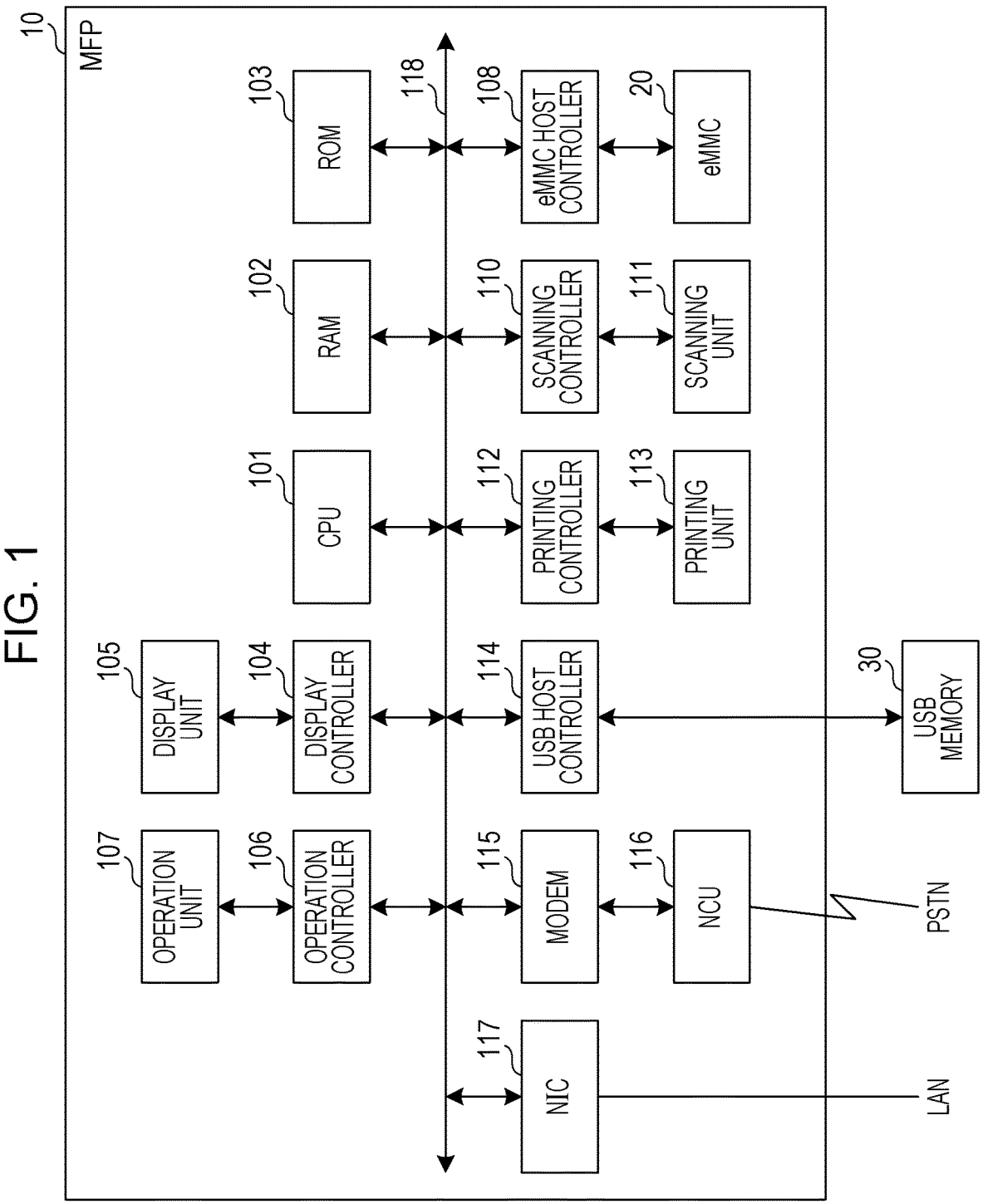
FIG. 1 a block diagram explaining an exemplary configuration of an information processing apparatus.

FIG. 1 is a block diagram explaining an exemplary configuration of an information processing apparatus according to a first embodiment. In the first embodiment, the configuration of an MFP for compound image processing will be described as an example.

In FIG. 1, the MFP, indicated at 10, includes a central processing unit (CPU) 101, a read-only memory (ROM) 103, a random access memory (RAM) 102, a display controller 104, a display unit 105, an operation controller 106, and an operation unit 107. The MFP 10 further includes an eMMC host controller 108, an eMMC 20, a scanning controller 110, a scanning unit 111, a printing controller 112, and a printing unit 113. In addition, the MFP 10 includes a USB host controller 114, a modem 115, a network control unit (NCU) 116, and a network interface card (NIC) 117.

The CPU 101 controls devices connected to a system bus 118 in a centralized manner. The CPU 101 executes a boot program stored in the ROM 103 when the MFP 10 is turned on. Typically, a predetermined start-up program, e.g., the boot program, allows a main program stored in a storage to be loaded into the RAM 102 and jumps to an initial position of the loaded main program. The boot program will be described in detail later. The RAM 102 functions as a work area for the main program as well as a location into which the main program is loaded.

The display controller 104 controls rendering on the display unit 105. The display unit 105 is a liquid crystal display (LCD) capable of displaying a character set of 28 characters by 7 rows, ruled lines, and a scroll bar. The operation controller 106 controls an input from the operation unit 107 included in the MFP 10. The operation unit 107 includes a numeric keypad, a cursor key, and a one-touch key.

The scanning unit 111 reads a document. The scanning unit 111 includes an optional automatic document feeder (not illustrated) such that a plurality of documents can be automatically read. The scanning unit 111 is connected to the scanning controller 110. The CPU 101 communicates with the scanning unit 111 via the scanning controller 110.

The printing unit 113 forms an image on a recording sheet in an electrophotographic manner. The printing unit 113 is connected to the printing controller 112. The CPU 101 communicates with the printing unit 113 via the printing controller 112.

The USB host controller 114 performs USB protocol control and permits an access to a USB device, such as a USB memory 30.

The modem 115 modulates and demodulates signals necessary for facsimile communication. The modem 115 is connected to the NCU 116. A signal modulated by the modem 115 is transmitted through the NCU 116 to a public switched telephone network (PSTN).

The NIC 117 transmits and receives data to and from, for example, a mail or file server via a local area network (LAN) in a bidirectional manner.

The MFP 10 according to the present embodiment includes the eMMC 20 as a storage. The CPU 101 accesses the eMMC 20 through the eMMC host controller 108.

Figure 2:
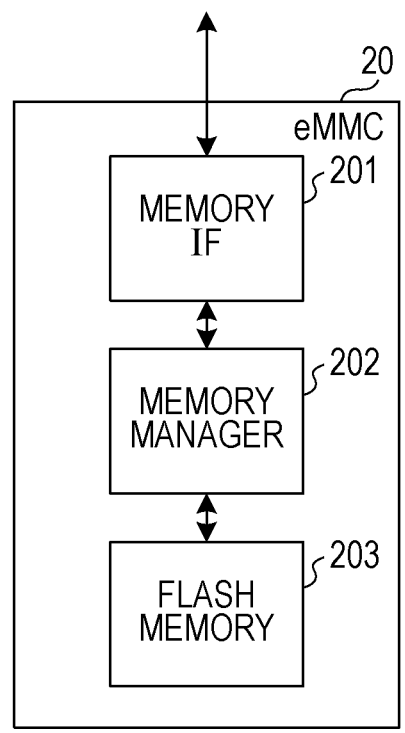
FIG. 2 is a block diagram illustrating an exemplary hardware configuration of an eMMC.

FIG. 2 is a block diagram illustrating an exemplary hardware configuration of the eMMC 20 in FIG. 1.

In FIG. 2, the eMMC 20 includes a memory interface (IF) 201, a memory manager 202, and a flash memory 203. The memory IF 201 communicates with the eMMC host controller 108. The memory manager 202 interprets a command transmitted from the CPU 101 through the memory IF 201 and permits an access to the flash memory 203. The flash memory 203 is a NAND flash ROM.

The memory manager 202 includes a mechanism for performing access leveling control in consideration of the service life of the flash memory 203. Furthermore, the memory manager 202 manages bad areas of the flash memory 203. If the number of bad areas exceeds a predetermined threshold, the memory manager 202 refuses a write request and accepts only a read request through the memory IF 201. In other words, the memory manager 202 controls the eMMC 20 such that the eMMC 20 operates in a read-only state.

Figure 3:
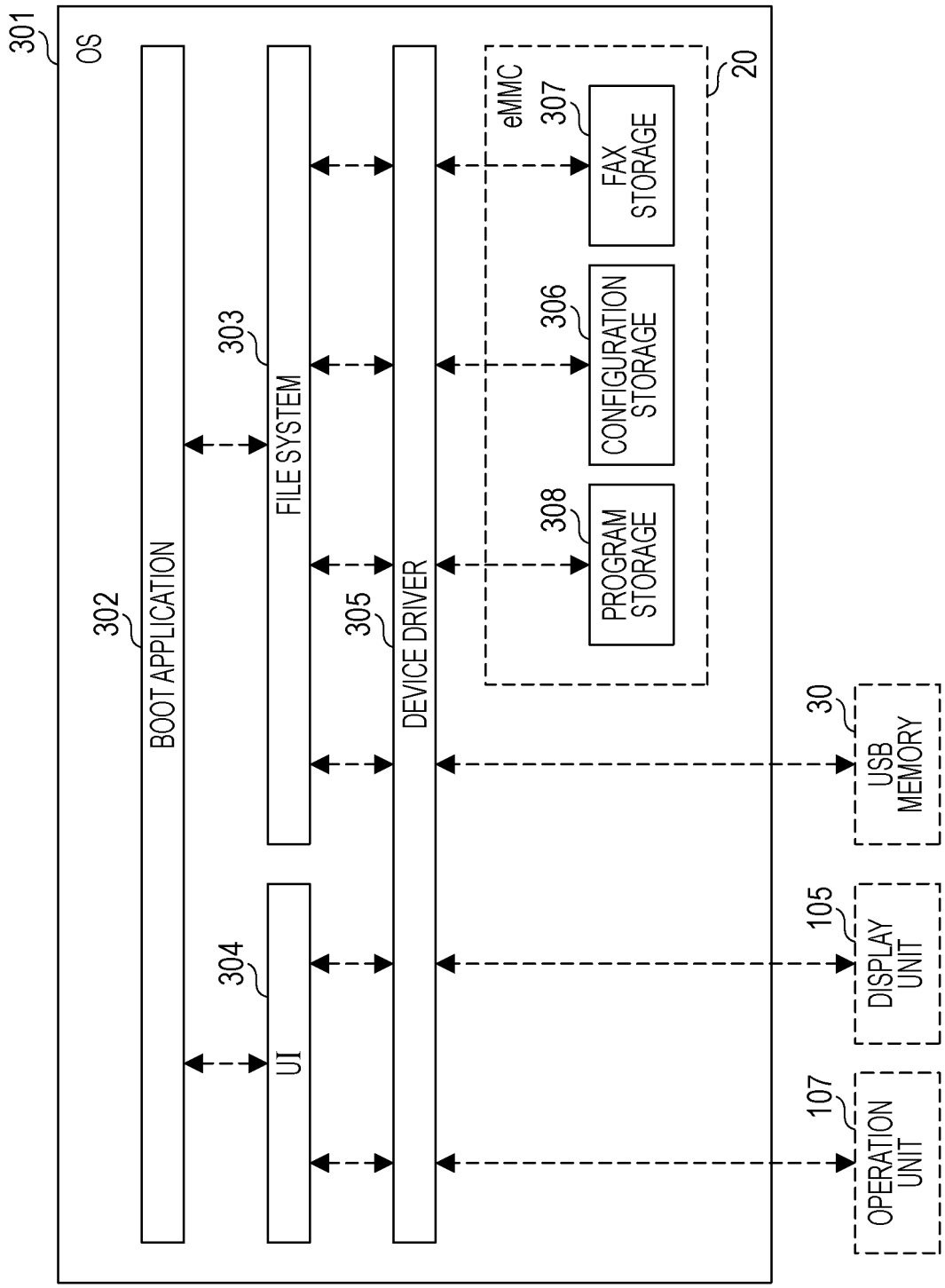
FIG. 3 is a block diagram illustrating an exemplary configuration of a boot program of the information processing apparatus.

FIG. 3 is a block diagram illustrating an exemplary software configuration of the boot program in the information processing apparatus in FIG. 1.

In FIG. 3, as described above, the boot program is stored in the ROM 103 and is sequentially executed by the CPU 101. The boot program includes an operating system (OS) 301, a boot application 302, a file system 303, a UI 304, and a device driver 305.

The OS 301 controls the order of execution of software modules included in the boot program and manages the entire boot program. The boot application 302 is an application program including flowcharts, which will be described later. The boot application 302 further includes the above-described process of loading the main program.

The UI 304 displays various items of information on the display unit 105 to provide the information to a user and accepts various instructions from the user through the operation unit 107. The OS 301 includes the device driver 305. The device driver 305 permits accesses to hardware devices, for example, the USB memory 30, the display unit 105, and the operation unit 107, such that the software modules included in the boot program access the hardware devices in a common manner.

The eMMC 20 is logically divided into a plurality of drives. Typical examples of the drives include a program storage 308, a configuration storage 306, and a fax storage 307. The program storage 308 stores the main program. The configuration storage 306 stores, for example, setting values for switching between operations of the main program. The fax storage 307 stores, for example, image data transmitted and received by fax in accordance with the main program and transmission destination data.

The file system 303 generalizes accesses to the drives of the eMMC 20 and the USB memory 30 from the boot application 302. The software modules, such as the boot application 302, can perform a common read or write process on any storage device through an application programming interface (API) provided by the file system 303.

Figure 4:
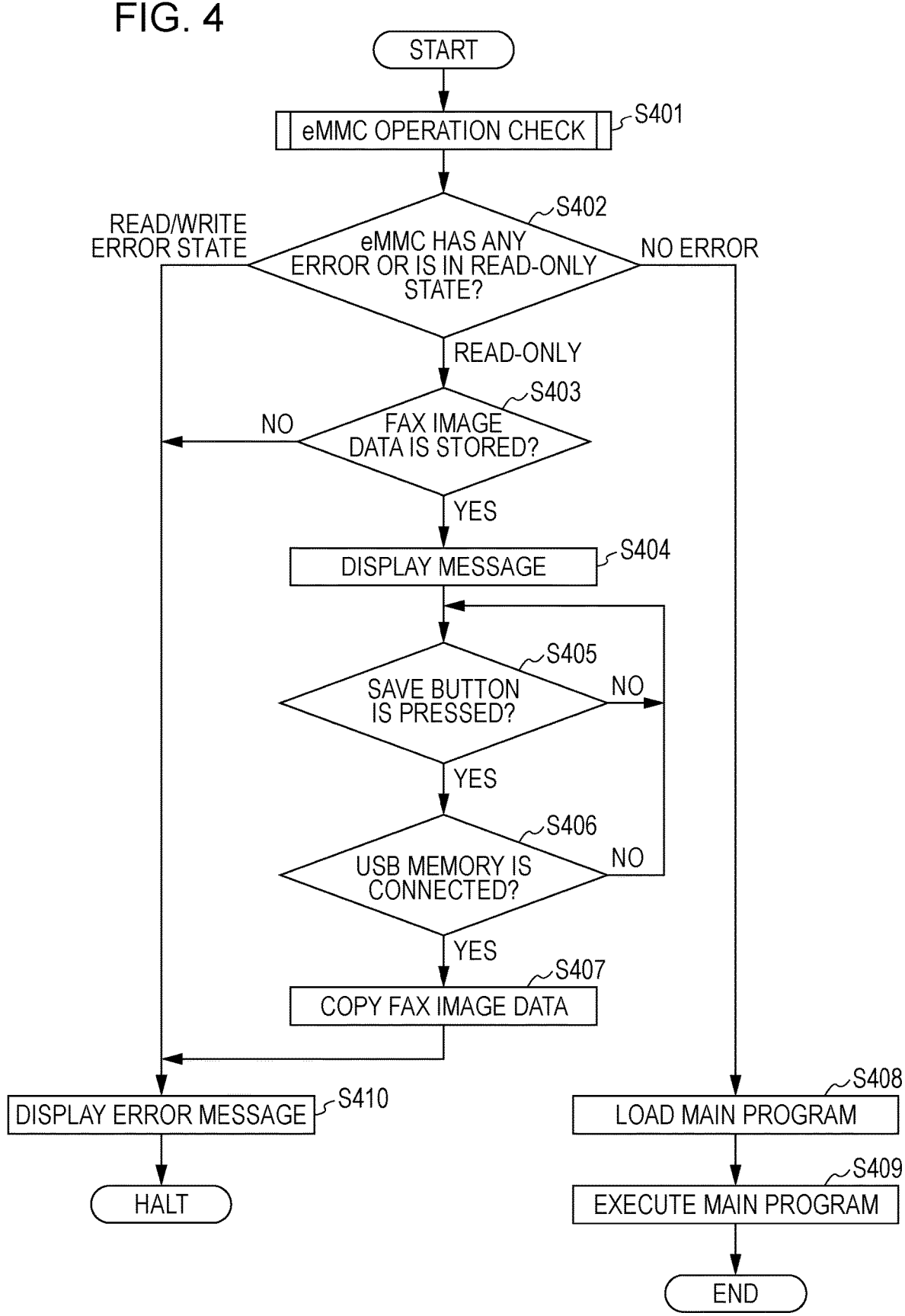
FIG. 4 is a flowchart explaining a control method for the information processing apparatus.

FIG. 4 is a flowchart explaining a control method for the information processing apparatus according to the present embodiment. In this case, a boot program start process will be described as an example. In FIG. 4, processing steps of the flowchart are achieved by implementing a control program stored in the ROM 103 through the CPU 101. Memory control in the present embodiment will now be described in detail.

In S401, the CPU 101 checks an operation state of the eMMC 20. This processing will be described in detail later. In S402, the CPU 101 determines a check result. If the eMMC 20 has no error, the process proceeds to S408. If the CPU 101 determines that the eMMC 20 is in the read-only state, the process proceeds to S403. If the CPU 101 determines that the eMMC 20 is in a read/write error state where read and write processes are disabled, the process proceeds to S410.

In S403, the CPU 101 determines whether particular data, e.g., received facsimile image data is stored in the fax storage 307 illustrated in FIG. 3. If the received facsimile image data is stored, the process proceeds to S404. If no received facsimile image data is stored, the process proceeds to S410.

Figure 7:
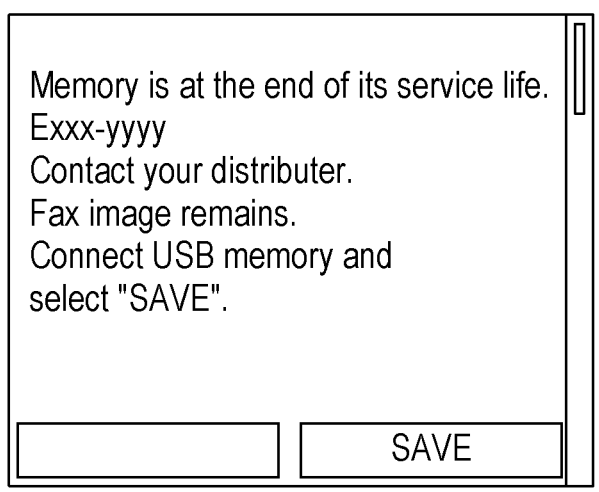
FIG. 7 is a diagram illustrating an example of a UI screen displayed on the information processing apparatus.

In S404, the CPU 101 allows the display unit 105 to display a message indicating that the storage (memory) is at the end of its service life and facsimile image data remains in the memory. In addition, the CPU 101 allows the display unit 105 to display a message that prompts the user to connect a USB memory and save the facsimile image data to the USB memory. FIG. 7 illustrates an exemplary UI screen.

In the UI screen of FIG. 7, an error code "Exxx-yyyy" indicates that the memory is at the end of its service life. This code is effectively used to refer to the manual of the apparatus or contact a call center.

In S405, the CPU 101 waits for pressing of a "SAVE" button illustrated in FIG. 7.

If the CPU 101 determines that the "SAVE" button is pressed, the process proceeds to S406. The CPU 101 determines whether the USB memory 30 is connected to the MFP 10. If the CPU 101 determines that the USB memory 30 is connected, the process proceeds to S407. If the CPU 101 determines that the USB memory 30 is not connected, the process returns to S405.

In S407, the received facsimile image data stored in the fax storage 307 illustrated in FIG. 3 is copied (written) into the USB memory 30. In the MFP 10 according to the present embodiment, the received facsimile image data is stored as files on a page-by-page basis such that the files correspond one-to-one to pages. The format of the image data is the JBIG format. All of the files of the pages received by fax are copied by using the API provided by the file system 303 in such a manner that the files are read one by one from the fax storage 307 illustrated in FIG. 3 and are sequentially written into the USB memory 30. At the completion of copying, the process proceeds to S410.

Processing in S408 is executed when it is determined in S402 that the eMMC 20 has no error. Specifically, the CPU 101 loads the main program, stored in the program storage 308 illustrated in FIG. 3, into the RAM 102. When the loading of the main program is completed, the process proceeds to S409. The main program is allowed to have an execution authority. The start process is terminated.

Processing in S410 is executed when it is determined in S402 that the eMMC 20 is in the read/write error state, when it is determined in S403 that no received facsimile image data is stored in the fax storage 307, or when processing in S407 is completed.

Figure 6:
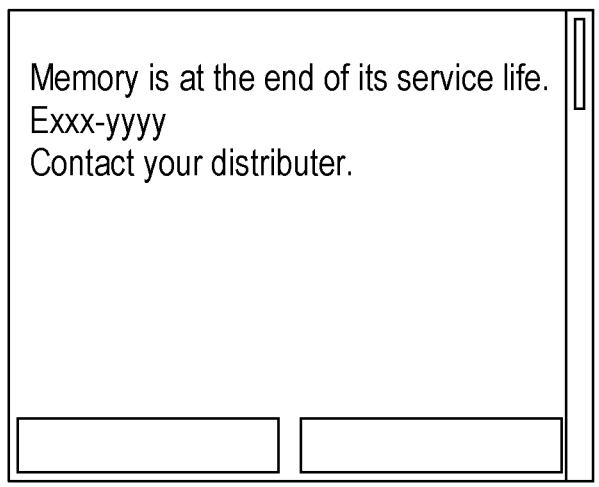
FIG. 6 is a diagram illustrating an example of a user interface (UI) screen displayed on the information processing apparatus.

In S410, the CPU 101 allows the display unit 105 to display a message indicating that the memory is at the end of its service life. FIG. 6 illustrates an exemplary UI screen in this case. In FIG. 6, the error code "Exxx-yyyy" is the same as that described above.

Figure 5:
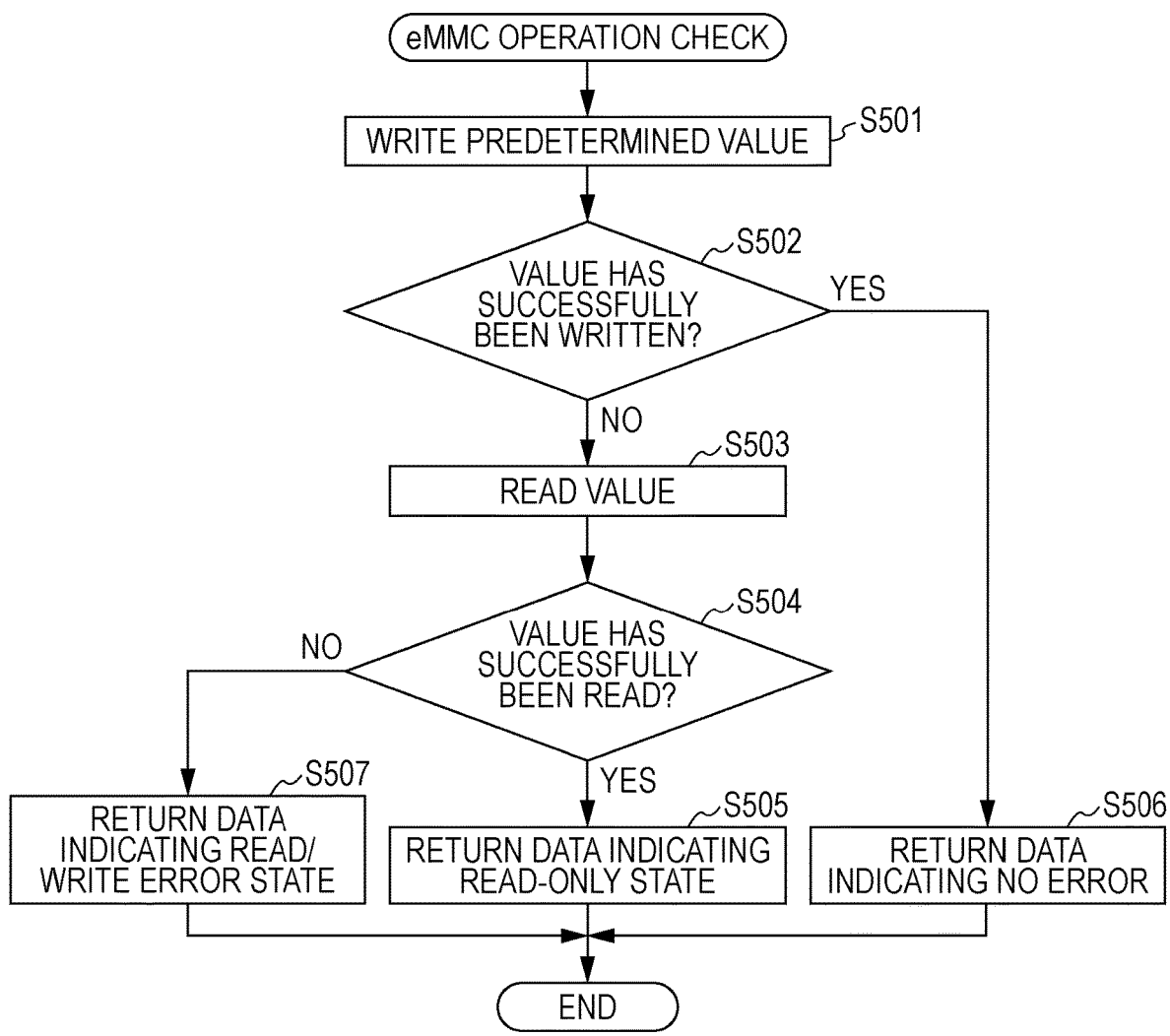
FIG. 5 is a flowchart explaining the control method for the information processing apparatus.

FIG. 5 is a flowchart explaining the control method for the information processing apparatus according to the present embodiment. FIG. 5 illustrates a detailed process corresponding to the processing in S401 in FIG. 4. Processing steps of the flowchart of FIG. 5 are achieved by implementing a control program stored in the ROM 103 through the CPU 101.

In S501, the CPU 101 writes a predetermined value into a file allocated to the configuration storage 306 illustrated in FIG. 3.

In S502, the CPU 101 determines whether the value has successfully been written. If the CPU 101 determines that the value has successfully been written, the process proceeds to S506. In S506, data indicating no error is returned to the CPU 101. The process is terminated.

On the other hand, if the CPU 101 determines in S502 that the value fails to be written, that is, a write error is returned in response to the write request because the memory manager 202 in FIG. 2 has detected the number of bad areas in the flash memory 203 exceeding the threshold as described above, the process proceeds to S503.

In S503, the CPU 101 reads a value from the file allocated to the configuration storage 306 in FIG. 3. In S504, the CPU 101 determines whether the value has successfully been read. If the CPU 101 determines that the value has successfully been read, the process proceeds to S505. In S505, data indicating that the eMMC 20 is in the read-only state is returned to the CPU 101. If the CPU 101 determines that the read value is not a predetermined value or that a read error is returned in response to the read request, the process proceeds to S507. In S507, data indicating that the eMMC 20 is in the read/write error state is returned to the CPU 101.

As described above, if the memory is at the end of its service life and is accordingly under unfavorable conditions for the load and start of the main program, the MFP 10 according to the present embodiment displays a service error message during execution of the boot program, thus preventing the main program from being loaded and started.

In addition, if received facsimile image data remains in the memory under the unfavorable conditions, the MFP 10 displays a message indicating this fact and prompts the user to save the data to a USB memory. The MFP 10 copies the received facsimile image data in the memory into the USB memory in accordance with a user instruction.

The copied received facsimile image data in the USB memory includes JBIG images as files stored on a page-by-page basis. These images can be browsed by a typical commercially available image display application for personal computers (PCs).

Other Embodiments

In the first embodiment, as described above, the read-only state of the eMMC 20 corresponds to the unfavorable conditions for the load and start of the main program. The present invention is not limited to this case.

For example, if the main program stored in the storage has logically failed, it may be determined that the storage is under unfavorable conditions for the load and start of the main program.

Specifically, the processing in S401 in FIG. 4 is replaced with checksum calculation for the main program. In S402, whether the calculated checksum agrees with a correct value stored in another storage is determined. If agreement is determined, the process proceeds to S408. If disagreement is determined, the process proceeds to S403. Such a configuration also offers the same advantages as those of the first embodiment.

Furthermore, the storage storing the main program does not have to be an eMMC. Any device, such as a hard disk drive (HDD) or a simple NAND flash memory, may be used so long as whether the device is under the unfavorable conditions for the load and start of the main program can be determined.

In the first embodiment, the received facsimile image data is a copy target that is copied into a USB memory. The present invention is not limited to this case. For example, the MFP may provide a storage service, called a box. If all of files stored in the box are copy targets, the files stored in the storage service can be prevented from being lost.

In the first embodiment, the USB memory is used as an external storage. The external storage does not have to be a USB memory. For example, a secure digital (SD) memory, or SD card may be used.

In the first embodiment, a copy process in the present invention has been described on the assumption that the main program of the MFP 10 allows received facsimile image data to be stored as files in the JBIG format on a page-by-page basis.

The present invention is not limited to the MFP in which data is stored as files in the JBIG format on a page-by-page basis. In addition, the image format may be PDF or JPEG, for example. Additionally, if a file includes data in the JBIG format and an MFP-specific header indicating the time of receipt or including various flags such that the header is added to the data, such a file can be handled.

Specifically, in S407, received facsimile image data stored in the fax storage 307 may be read, MFP-specific header part may be skipped, and the rest of the data may be written (copied) into a USB memory. In such a configuration, data of a file with an MFP-specific header can be copied into a USB memory and the data can be browsed by a typical application.

Furthermore, data can be browsed in a manner other than by a typical application. For example, if the MFP is configured such that a file in the JBIG format stored in a USB memory can be directly printed, such a configuration enables data to be browsed. In addition, if the MFP is configured such that an MFP-specific image file stored in a USB memory can be directly printed, the file may be merely copied in S407, so that the file can be browsed. An optional PC application that enables an MFP-specific image file to be browsed may be used. This enhances user convenience.

According to the above-described embodiments, image data, such as received facsimile image data, can be prevented from being lost under unfavorable conditions for the load and start of a main program.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-264250, filed Dec. 26, 2014, which is hereby incorporated by reference herein in its entirety.

What is claimed is:

1. An information processing apparatus comprising:
a facsimile communication device;
a first storage that is a nonvolatile storage configured to store facsimile image data;
a display that displays a notification to a user;
a printer that prints an image on a sheet; and
a controller,
wherein, based on activation of the information processing apparatus, the controller detects a state of the first storage,
wherein, in a state that the first storage is in a writeable and readable state, the controller causes the printer to shift into a printable state,
wherein, in a state that the first storage is in a non-writeable and readable state, the controller confirms whether or not the facsimile image data is stored in the first storage,
wherein, based on confirming that the facsimile image data is stored in the first storage, the controller causes the display to display a notification that prompts the user to connect a second storage different from the first storage to the information processing apparatus, and
wherein, based on connecting the second storage to the information processing apparatus, the controller causes the facsimile image data stored in the first storage to be stored into the second storage from the first storage.

2. The information processing apparatus according to claim 1, wherein, in a state that the facsimile image data is stored in the first storage, the controller causes the display to display the notification that prompts the user to connect the second storage and a notification indicating that the facsimile image data is stored, and
wherein, in a state that the facsimile image data is not stored in the first storage, the controller causes the display to display a notification indicating an error of the information processing apparatus.

3. The information processing apparatus according to claim 1, wherein whether the first storage is in the non-writeable and readable state is determined based on a checksum of the data stored in the first storage.

4. The information processing apparatus according to claim 1, wherein the first storage is an embedded multi-media card (eMMC).

5. The information processing apparatus according to claim 1, wherein the first storage is a hard disk drive (HDD).

6. The information processing apparatus according to claim 1, wherein the first storage is a flash memory.

7. The information processing apparatus according to claim 1, wherein the second storage is a universal serial bus (USB) memory.

8. The information processing apparatus according to claim 1, wherein the second storage is a secure digital (SD) memory.

9. The information processing apparatus according to claim 1, wherein the facsimile image data is image data that does not include data added to identify the facsimile image data.

10. The information processing apparatus according to claim 1, wherein the first storage stores a main program,
wherein the controller includes the first storage storing instructions and the processor which executes the instructions, and
wherein the controller executes the main program based on determining that the first storage is not in the writeable and readable state.

11. The information processing apparatus according to claim 1, wherein, based on determining that the second storage is connected, the controller reads the facsimile image data as files from the first storage and writes the read data into the second storage.

12. The information processing apparatus according to claim 1, wherein, upon completion of writing the facsimile image data into the second storage, the controller causes the display to display a notification indicating an error of the information processing apparatus.

13. The information processing apparatus according to claim 1, wherein the facsimile image data is stored as files each of which contains data for a page.

14. The information processing apparatus according to claim 1, wherein the controller confirms whether the second storage is connected to the information processing apparatus, and
wherein, after confirming that the second storage is connected, the controller reads the facsimile image data from the first storage and stores the facsimile image data into the second storage.

15. The information processing apparatus according to claim 1, wherein, in a state that the first storage is in a non-writeable and non-readable state, the controller causes the display to notify an error of the information processing apparatus.

16. A memory control method for an information processing apparatus including a facsimile communication device, a first storage that is a nonvolatile storage configured to store facsimile image data, a display that displays a notification to a user, a printer that prints an image on a sheet, and a controller, the method comprising the steps of:
based on activation of the information processing apparatus, detecting a state of the first storage;
in a state that the first storage is in a writeable and readable state, causing the printer to shift into a printable state;
in a state that the first storage is in a non-writeable and readable state, confirming whether or not the facsimile image data is stored in the first storage;
based on confirming that the facsimile image data is stored in the first storage, causing the display to display a notification that prompts the user to connect a second storage different from the first storage to the information processing apparatus; and
based on connecting the second storage to the information processing apparatus, causing the facsimile image data stored in the first storage to be stored into the second storage from the first storage.

17. A non-transitory computer-readable storage medium storing a program including instructions, which when executed by a computer of an information processing apparatus including a facsimile communication device, a first storage that is a nonvolatile storage configured to store facsimile image data, a display that displays a notification to a user, a printer that prints an image on a sheet, and a controller, cause the information processing apparatus to perform the following steps of:
based on activation of the information processing apparatus, detecting a state of the first storage;
in a state that the first storage is in a writeable and readable state, causing the printer to shift into a printable state;
in a state that the first storage is in a non-writeable and readable state, confirming whether or not the facsimile image data is stored in the first storage;
based on confirming that the facsimile image data is stored in the first storage, causing the display to display a notification that prompts the user to connect a second storage different from the first storage to the information processing apparatus; and
based on connecting the second storage to the information processing apparatus, causing the facsimile image data stored in the first storage to be stored into the second storage from the first storage.

* * * * *